Nov. 5, 1935.  C. E. WILLIAMS  2,020,045
INSTRUMENT FOR LOCATING THE METATARSAL ARCH
Filed Jan. 17, 1933  2 Sheets-Sheet 1
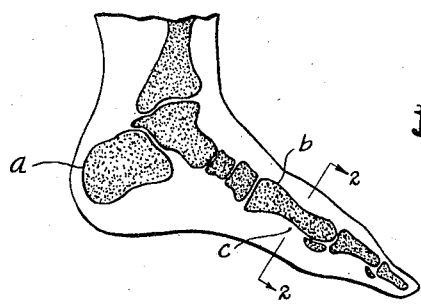
Fig. 1
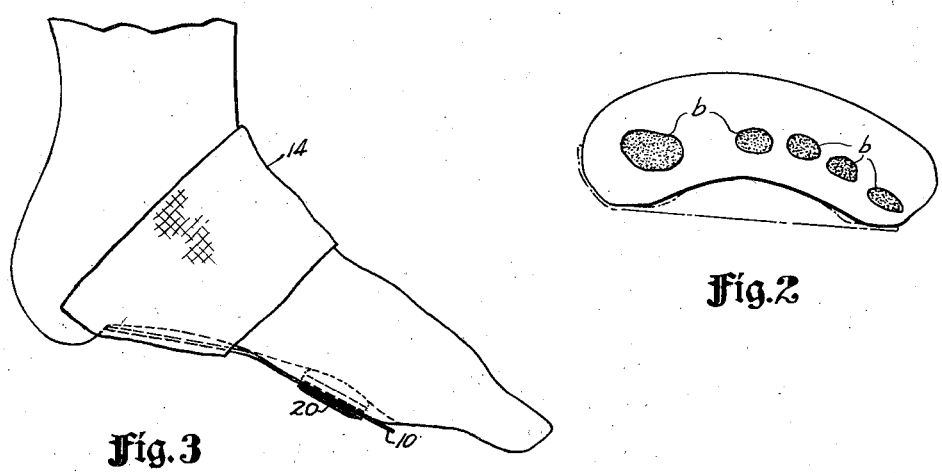
Fig. 2
Fig. 3
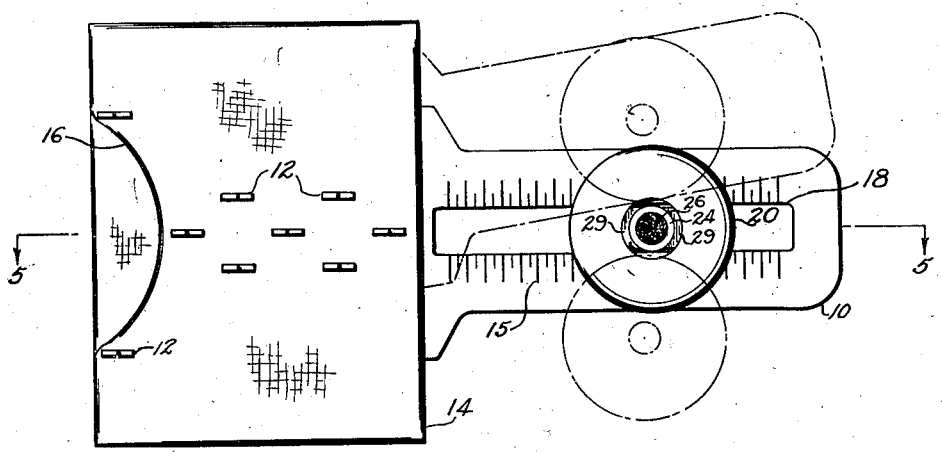
Fig. 4
INVENTOR
Clarence E. Williams
BY
Justin W. Macklin
ATTORNEY Nov. 5, 1935.     C. E. WILLIAMS     2,020,045
INSTRUMENT FOR LOCATING THE METATARSAL ARCH
Filed Jan. 17, 1933      2 Sheets-Sheet 2

INVENTOR
Clarence E. Williams
BY
Justin W. Macklin
ATTORNEY

Patented Nov. 5, 1935

2,020,045

UNITED STATES PATENT OFFICE 2,020,045

INSTRUMENT FOR LOCATING THE METATARSAL ARCH

Clarence E. Williams, Lakewood, Ohio

Application January 17, 1933, Serial No. 652,186

6 Claims. (Cl. 33—3)

My invention relates to a precision instrument for determining the exact location of the metatarsal arch of a human foot.

Various foot and allied troubles are caused by a lowering of the metatarsal arch. To correct these troubles artificial means are resorted to to support the arch. It is highly desirable that the exact point requiring support be located with some particularity and precision, so that the support will give the utmost relief and at the same time not give rise to other foot irregularities due to a wrong positioning of the support.

My invention contemplates a precision instrument for locating the exact point of the arch requiring support, so that a suitable support may be inserted within the shoe of the wearer in a position at all times exact for the correction of the irregularity.

I have found that the proper point requiring support may be best located with respect to the anterior part of the os calcis bone, and it is therefore an object of my invention to provide a device which locates the metatarsal arch with respect to this part of the os calcis bone.

It is a well known fact that the high part of the metatarsal arch transversely of the foot is not necessarily alike with any two persons and that to secure proper relief from the then existing trouble it is necessary to locate the high point of the arch transversely as well as longitudinally of the foot. It is therefore an object of my invention to provide an instrument which will properly locate the high point of the metatarsal arch in both a transverse and longitudinal direction with respect to the os calcis bone.

Observations of the many types of feet with their corresponding bone structures, and the variegated styles of shoes worn by different persons, give rise to the scientific conclusion that the proper correction of foot ailments, and those flowing from such, requires that the use of an artificial support be properly determined for each and every specific foot and for the specific shoe worn on that foot. For example, a person having a normally high metatarsal arch may wear a shoe of one shape at certain times and at other times wear a shoe of relatively different shape, whereby the arch may be properly supported in one shoe and not in the other.

It is therefore an object of my invention to provide an instrument for determining the correct location for an artificial support for a specific shoe, so that regardless of the type of shoe worn an artificial support may be placed therein to correctly support the arch of the foot for that shoe.

One of the difficulties encountered in applying artificial supports within a shoe is that of correctly locating the support. It is an object of my invention to provide a recording metatarsal arch locating device which may be attached to the foot, so that after the correct point of the metatarsal arch requiring support has been determined, the shoe may be slipped on over the foot with the instrument still attached, but in no way obstructing the entry of the foot into the shoe, and as the wearer places weight upon the foot with the instrument attached, a correct indication is made on the inner sole of the shoe whereby an artificial support may be located at the precise and correct point for that combination of foot and shoe.

Yet other and more specific objects of my invention will be apparent as it is more fully understood, and in illustrating the use of and a form of my invention in the attached drawings, Fig. 1 is a diagrammatic view, in elevation, of a human foot showing the bone structure.

Fig. 2 is a transverse sectional view along the line 2—2 of Fig. 1 showing the bone structure with respect to the metatarsal arch.

Fig. 3 is a side elevation of a human foot showing a form of my invention in place.

Fig. 4 is a bottom plan view of the device shown in Fig. 3.

Before proceeding with the description of my invention I wish to specifically point out, by reference to Figs. 1 and 2 of the drawings, the exact point of the foot which it is desired to locate by use of my device. In Fig. 1 $a$ represents the os calcis or heel bone of the foot and $b$ represents one of the metatarsal bones. As viewed in Fig. 1, it is desired to locate a point immediately under the metatarsal bones $b$ and approximately at the point indicated at $c$. As viewed in Fig. 2, it is desired to so locate a support under the metatarsal bones such that its relative position with respect to the foot will be as there indicated in dot and dash lines, and the arched structure of these bones maintained transversely of the foot. My invention therefore comprises a device which locates this part of the foot with particularity and precision.

Figure 5:
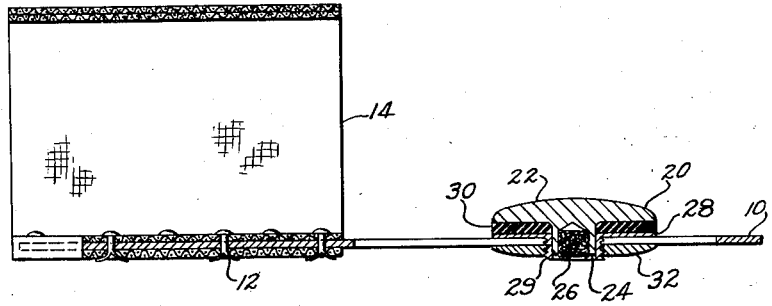
Fig. 5 is a longitudinal cross section of the device.

Referring now in particular to Figs. 3, 4 and 5 of the drawings, and using reference numerals to designate the parts there shown, 10 is a relatively thin flexible supporting arm member having a greater width adjacent one end thereof, to which is suitably secured, as by rivets 12, a closed elastic band member 14. This elastic band member 14 is shown to be of double thickness and the wide portion of the supporting arm member 10 is secured between the two plys. The wide end of the supporting arm 10 also has a crotched portion 16, and the elastic band member secured to the supporting arm is cut away adjacent thereto to preserve this crotch. The relatively narrow part of the supporting arm 10 has a longitudinal slot 18 therethrough, in which is disposed an arch locating button designated in its entirety at 20. This button is adapted to be slidable in the longitudinal slot 18, as will now be described.

Referring particularly to Fig. 5, it is there shown that the locating button 20 is composed of a cap member 22 having extending therefrom a projecting hollow cylinder portion 24 having disposed therein and projecting slightly therefrom an absorbent member 26, adapted to retain ink, paint or the like. A circular disk member 28 has projecting therefrom a pair of arcuate projections 29 partly concentric with the cylindrical member 24. The outer periphery of the projections 29 is threaded. The projections are adapted to be passed through the slot 18 of the supporting arm 10 and their width thereacross is slightly less than the width of the slot 18 so as to permit easy sliding therealong but to prevent turning in the slot. A flat disk washer 32 having a threaded inside diameter is adapted to fit on the opposite side of the supporting arm 10 and screw to the threaded projections 29 to retain the locating button 20 in sliding position on the supporting arm 10. Between the cap member 22 and the disk member 28 may be positioned a resilient washer 30 of soft rubber or the like, which permits the member 22 to be depressed so that the absorbent member 26 may contact with a surface to be marked. This prevents a mark being made except when pressure is applied to the button. This resilient washer is cemented or otherwise secured to the complementary faces of the cap member 22 and the disk member 28, and thereby holds these two members in assembled relation.

While there has been illustrated a device having an elastic band for the member 14, it will be apparent that other and similar materials may be used. Further, while the locating button 20 has been shown as comprised of a plurality of specific assembled parts, it will be obvious that this may be comprised of any suitable number or design of parts. The arm 10 may also have a suitable scale thereon, as indicated at 15.

In locating the metatarsal arch I have found it more accurate and desirable to determine this location with respect to the anterior part of the os calcis bone $a$. I therefore apply my locating device to the human foot as shown in Fig. 3, in which case the elastic supporting band 14 draws the supporting arm 10 close against the under part of the foot and by suitably adjusting the band 14 and arm 10 I may cause the crotch 16 to press firmly against the under portion of the heel and against the anterior part of the os calcis bone $a$.

With this done, the arch locating button may be moved along longitudinally of the slot 18 until it is just beneath the metatarsal arch of the foot or at the point $c$ indicated in Fig. 1. Since the supporting band 14 is flexible the button also may be moved transversely of the foot by virtue of this flexibility, as indicated in dot and dash lines in Fig. 4, and the correct position of the metatarsal arch both longitudinally and transversely of the foot is thereby determined. The locating button may now be locked in position by tightening the disk washer 32. The supporting arm 10 being of thin flexible material will readily adapt itself to the conformation of the underside of the foot.

Figure 6:
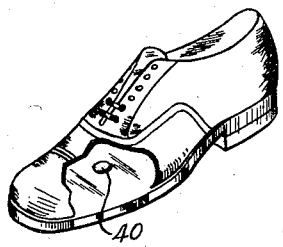
Fig. 6 is a cut-away perspective view of a shoe showing an indication made therein by the device.

With the device now in place and the proper point of the arch requiring support having been determined, the wearer's shoe may be slipped on the foot in the usual manner and pressure applied on the foot while in the shoe to depress the cap member 22 to cause the absorbent member 26 to make an indication on the inner sole of the shoe, such as shown at 40 in Fig. 6. This mark may correspond with a similar one on a suitable artificial support and therefore eliminates guesswork in determining the exact point at which an artificial support should be placed within the shoe to properly support the metatarsal arch. When pressure is applied on the foot the "feel" of the locating button will indicate if correctly located. The foot may now be withdrawn from the shoe and the device detached.

Figure 7:
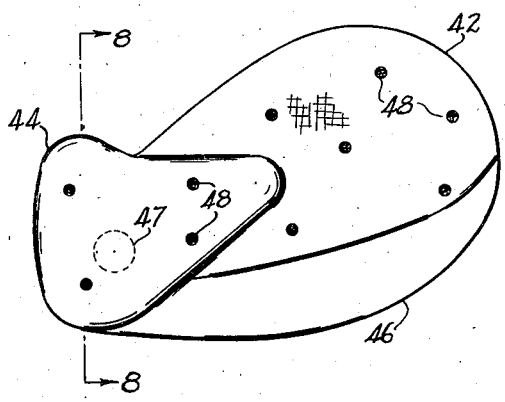
Fig. 7 is a plan view of a support to be positioned within the shoe.
Figure 8:
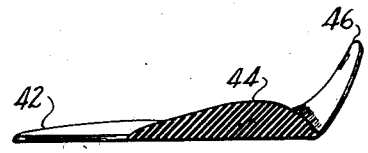
Fig. 8 is a cross sectional view along the lines 8—8 of Fig. 7.

In Figs. 7 and 8 is illustrated a type of support which is especially adapted to support the metatarsal arch in accordance with the location as just determined. This support comprises a relatively thin tongue-like body 42, which merges at one end into a substantially triangular thickened body portion 44, the latter having a varying cross section adapted to properly support the metatarsal arch. A section is indicated in Fig. 8. One edge of the relatively thin body 42 is turned upwardly, as at 46, to fit under the high part of the instep of the foot, whereas the other part is relatively flat and likewise fits under the outside lower part of the instep.

The thickened body 44 has imprinted thereon on the underside a mark 47, such as for instance a black dot, which mark corresponds with that made by the locating device within the shoe, and when the support is located so that the two marks are coincident it is correctly placed. The pad or support may be glued or otherwise secured within the shoe, with the thin body portion 42 of the support extending towards the rear of the shoe.

It will be seen that I have provided means for correctly locating the metatarsal arch, and for locating an artificial support in a shoe for bracing or supporting the arch to retain or position the metatarsal bones in their normal or natural relation.

I claim:

1. A metatarsal arch locator comprising a flexible supporting arm and an arch locating button slidably associated with said arm, one end of said arm being adapted to fit against the anterior part of the under side of the heel of a foot, means for securing said arm to the foot, whereby when the foot is placed in a shoe with the arm attached the arm conforms to the under side of the foot.

2. In a metatarsal arch locating instrument the combination of a supporting arm having a crotch in one end thereof, means for holding said arm to the under side of a human foot and causing said crotch to press against the anterior part of the under side of the heel against the os calcis bone, and an arch locating button slidably secured to said arm, said button having a marking device associated therewith, whereby a mark is made on the inner sole of a shoe fitted to a foot with the instrument attached indicating the position of the metatarsal arch.

3. A device for locating the metatarsal arch of a foot comprising a flexible arm having a marking arch locating button slidably associated therewith, an elastic band secured to one end of said arm and adapted to hold one end of said arm in close engagement with the anterior part of the under side of the heel of a foot, whereby the arch locating button may be adjusted longitudinally and transversely of the foot to locate the high point of the metatarsal arch.

4. In combination, a supporting arm and an arch locating member slidably associated with said arm and comprising a button element adapted to be locked in various positions on said arm, and means including said member for placing a mark upon an object in contact with said member, said means being operable only when pressure is applied to one side of said member.

5. In an instrument for locating the metatarsal arch of a human foot, an elastic band adapted to embrace a foot, a supporting arm associated with said elastic band and adapted to be held thereby against the underside of a human foot in adjusted positions longitudinally and transversely of the foot, with one end of the arm pressing against the anterior part of the os calcis bone, a member slidably secured on said arm, said member being positionable under the metatarsal arch by movement of the arm transversely of the foot and by movement of the member longitudinally of the arm.

6. In an instrument for locating the metatarsal arch of a human foot, an elastic band adapted to embrace a foot, a supporting arm associated with said elastic band and adapted to be held thereby against the underside of a human foot in adjusted positions longitudinally and transversely of the foot, a member slidably secured on said arm, said member being positionable under the metatarsal arch by movement of the arm transversely of the foot and by movement of the member longitudinally of the arm, said instrument being adapted to permit a shoe to be slipped over said foot with the instrument in place, and means associated with the member slidably secured on said supporting arm and operably responsive to pressure applied to the upper side of said member to place a mark on said shoe.

CLARENCE E. WILLIAMS.